United States Patent [19]

Shiohara et al.

[11] 4,118,227

[45] Oct. 3, 1978

[54] PROCESS FOR PRODUCING DICALCIUM SILICATE POWER

[75] Inventors: Tomoo Shiohara, Kyoto; Minoru Miyamoto, Suita; Nobuo Tamaki, Kyoto, all of Japan

[73] Assignee: Sekisui Kagaku Kogyo Kabushiki Kaisha, Japan

[21] Appl. No.: 799,131

[22] Filed: May 20, 1977

[30] Foreign Application Priority Data

May 24, 1976 [JP] Japan .............................. 51-60407
Mar. 23, 1977 [JP] Japan .............................. 52-32589
Mar. 23, 1977 [JP] Japan .............................. 52-32590

[51] Int. Cl.$^2$ ........................................... C09C 1/02
[52] U.S. Cl. .................................. 106/306; 106/120; 106/300; 106/296

[58] Field of Search ........................... 106/306, 120

[56] References Cited

U.S. PATENT DOCUMENTS 3,928,058  12/1975  Schmitt-Henco et al. .......... 106/120
3,998,650  12/1976  Schmitt-Henco et al. .......... 106/120

*Primary Examiner*—Patrick Garvin
*Assistant Examiner*—J. V. Howard
*Attorney, Agent, or Firm*—Wenderoth, Lind & Ponack

[57] ABSTRACT

An improved process for producing γ-dicalcium silicate powder which is fine and has a uniform particle size. The γ-dicalcium silicate power has a great ability to capture hydrogen halides and low hygroscopcity, and is useful as a stabilizer for halogen-containing synthetic resins and a filler for synthetic resins.

25 Claims, No Drawings

PROCESS FOR PRODUCING DICALCIUM SILICATE POWER

This invention relates to an improved process for producing dicalcium silicate powder, and more specifically, to a process for producing dicalcium silicate powder which is fine and has a uniform particle diameter.

Dicalcium silicate ($Ca_2SiO_4$) has been extensively studied as a hydraulic ingredient of cement. It is known that dicalcium silicate (to be abbreviated as "$C_2S$") is a polymorph which assumes four types, $\alpha, \alpha', \beta$ and $\gamma$. The $\alpha, \alpha'$ and $\beta$ types are hydraulic and effective as hydraulic ingredients of cement. The $\gamma$-type $C_2S$ (to be abbreviated as "$\gamma$-$C_2S$"), however, is not hydraulic, and is considered useless as an active ingredient of cement.

The temperature range within which $C_2S$ is stable is 2130° to 1450° C for the $\alpha$-type, 1450° to 850° C for the $\alpha'$-type, 725° to 525° C for the $\beta$-type, and not more than 850° C for the $\gamma$-type. Thus, only the $\gamma$-type crystal is stable at room temperature. In order to maintain the $\alpha, \alpha'$ and $\beta$-type crystals of $C_2S$ stable at room temperature while minimizing the formation of $\gamma$-$C_2S$ which is ineffective as a hydraulic ingredient of cement, many attempts have been made heretofore to replace a part of a Ca ion or a part of an Si ion by another metal or nonmetal ion in the production of $C_2S$ [see, for example, K. Suzuki et al., Yogyo-Kyokai-Shi 79 (6) 23–32 (1971)].

The $\gamma$-$C_2S$ has thus been considered to be a useless material for industrial purposes, and there has been hardly any attempt to produce and utilize it in industrial applications. The only prior work we know is disclosed in K. Speakman et al., J. Chem. Soc. (A), 1967, 1052–1060 which states that $\gamma$-$C_2S$ reacts with water under severe conditions (150° to 600° C and 5 to 350 bars) to form a hydrate.

On extensive work to exploit valuable uses for $\gamma$-$C_2S$, we found that $\gamma$-$C_2S$ can be used as a filler for synthetic resins, and is also useful as a stabilizer for certain synthetic resins, for example polyvinyl chloride. We have also found that in order for $\gamma$-$C_2S$ to be commercially feasible as a filler or stabilizer for snythetic resins, it should be fine and have as uniform a particle diameter as possible.

It is known on the other hand that when cooled from a high temperature, substantially pure $C_2S$ abruptly changes to the $\gamma$-type having a high specific volume at not more than 500° C, and is therefore reduced to a fine powder (the phenomenon being what is called "dusting") [see, for example, "Ceramics Industry Handbook" (Japanese-language publication), page 1678, edited by the Japan Association of Ceramics and published by Gihodo Co., Ltd on Dec. 25, 1966].

Since no positive attempt has ever been made to produce $\gamma$-$C_2S$, it has not been made clear under what conditions $\gamma$-$C_2S$ can be well reduced to a fine powder having a uniform particle diameter.

It is an object of this invention to provide a process for producing a $\gamma$-$C_2S$ powder which is fine and has a uniform particle diameter.

Another object of this invention is to provide a process for producing a $\gamma$-$C_2S$ powder which is fine and has a uniform particle diameter and a very high specific surface area.

Still another object of this invention is to provide a process for producing a $\gamma$-$C_2S$ powder which is fine with a uniform particle diameter and has a great ability to capture hydrogen halides, and is therefore useful as a stabilizer for halogen-containing resins.

A further object of this invention is to provide a process for producing a $\gamma$-$C_2S$ powder which is fine with a uniform particle diameter and has low hygroscopicity, and therefore is useful as a filler for synthetic resins.

Other objects and advantages of the invention will become apparent from the following description.

According to the present invention, there is provided a process for producing dicalcium silicate by burning a starting material comprising a calcium oxide component and a silicon dioxide component, wherein the burning is carried out in the presence of at least one compound selected from the group consisting of titanium oxide, zinc oxide, alkali metal chlorides and alkaline earth metal chlorides, and the resulting $\gamma$-dicalcium silicate is recovered in the form of a fine powder.

Dicalcium silica, or $C_2S$, is a compound expressed by the chemical formula $Ca_2SiO_4$ having a structure in which 2 molecules of CaO and 1 molecule of $SiO_2$ are chemically bound to each other. It is usually produced by burning a starting material comprising a calcium oxide (CaO) component and a silicon dioxide ($SiO_2$) component at high temperatures.

A first feature of the present invention is that the starting material is burned in the presence of at least one compound selected from the group consisting of titanium oxide, zinc oxide, alkali metal chlorides and alkaline earth metal chlorides. When the product obtained by burning under these conditions is cooled, $\gamma$-$C_2S$ can be obtained as a very fine powder despite the absence of any special pulverizing treatment, and the particle size of the powder obtained is very uniform. It has also been found that when the burning is carried out in the presence of an alkali metal chloride or an alkaline earth metal chloride, the resulting $\gamma$-$C_2S$ powder has a very high surface area in addition to its fine and uniform size.

The starting material used in the production of dicalcium silicate comprises a calcium oxide component and a silicon dioxide component. The "calcium oxide component" (to be referred to as a CaO component), as used in the present application, denotes a CaO-containing or CaO-liberating ingredient which can be introduced into the structure of $C_2S$ as CaO. The "silicon dioxide component" (to be referred to as an $SiO_2$ component), as used in the present application, denotes an $SiO_2$-containing or $SiO_2$-liberating ingredient which can be introduced into the structure of $C_2S$ as SiO.

The starting material may be a single substance containing the CaO component and $SiO_2$ component in the bonded state. Or the starting material may be a mixture of a CaO-containing substance and an $SiO_2$-containing substance.

Desirably, the starting material consists essentially of the CaO component and the $SiO_2$ component. It is also desirable that the solid product obtained after the burning treatment to be described should not contain an ingredient which will leave solid substances other than $\gamma$-$C_2S$ either in the free state or in the state bonded to CaO and/or $SiO_2$.

Wollastonite ($CaSiO_3$) is an example of the single substance which contains the CaO component and $SiO_2$ component in the bonded state.

The CaO-containing substance present in the starting material in which it is present independently of the $SiO_2$ component includes not only calcium oxide, i.e. quick lime, but also CaO-containing compounds which decompose to CaO and a volatile matter under the burning conditions to be described. Typical examples of such CaO-containing compounds are calcium hydroxide, calcium carbonate, and calcium hydrogen carbonate. Of these, calcium carbonate is especially suitable.

Desirably, the CaO-containing substance is as pure as possible in order to minimize the formation of $\alpha$-,$\alpha'$- and/or $\beta$-type $C_2S$ and obviate the need to purify the $\gamma$-$C_2S$ recovered. Preferably, it has a purity of at least 95%.

The $SiO_2$-containing substance can consist essentially of silicon dioxide, or may be $SiO_2$-containing compounds which decompose to silicon dioxide and a volatile matter under the burning conditions to be described. Specific examples of the $SiO_2$-containing substance include amorphous silica, silicic anhydride, siliceous stone, silica sand, quartz, and silicic acid. Of these, silicic anhydride and siliceous stone are especially preferred. For the same reason as given above, the $SiO_2$-containing substance has the highest possible purity, preferably a purity of at least 95%.

The ratio between the CaO component and $SiO_2$ component in the starting material for $C_2S$ is not limited to a narrow range, and can e varied over a wide range according, for example, to the types of the CaO component and $SiO_2$ component, and the burning conditions.

It is generally advantageous to use 30 to 100 parts by weight, preferably 40 to 60 parts by weight, more preferably 50 to 55 parts by weight, of the $SiO_2$ component calculated as $SiO_2$ per 100 parts by weight of the CaO component calculated as CaO.

According to the present invention, the starting material described above is burned in the presence of at least one compound selected from the group consisting of titanium oxide, zinc oxide, alkali metal chlorides and alkaline earth metal chlorides. These compounds can be added in any desired form so long as they will take the form of such compounds under the burning conditions. For example, titanium oxide may be added as such, and also as a substance which decomposes to titanium oxide and a volatile matter under the burning conditions, such as titanium hydroxide. For commercial operations, suitable titanium oxide sources may include, rutile-type or anatase type titanium pigment, and rutile.

Likewise, zinc oxide may be added as such or as a substance which decomposes to zinc oxide and a volatile matter under the burning conditions, such as zinc hydroxide, zinc carbonate and zinc oxalate. For commercial operations, suitable zinc oxide sources may include hydrozincite and red zinc ore.

The alkali metal chlorides that can be used in this invention include sodium chloride, potassium chloride, lithium chloride, rubidium chloride, and cerium chloride. Of these, sodium chloride is especially suitable. The alkaline earth metal chlorides include beryllium chloride, magnesium chloride, calcium chloride, strontium chloride, and barium chloride. Of these, magnesium chloride and calcium chloride are especially preferred.

The aforesaid substances may be used alone or as admixture of two or more. These substances may be mixed with the starting material before the burning, or added to it during the burning.

Preferably, these additives are generally used in the form of powder.

The amount of the additive is not critical, and can be varied over a wide range according, for example, to the types of the CaO component and the $SiO_2$ component in the starting material used, the burning conditions, and the type of the additive. To achieve appreciable effects, the burning is carried out advantageously in the presence of at least 0.3 part by weight, preferably 0.5 to 50 parts by weight, of the additive per 100 parts by weight of the CaO component in the starting material calculated as CaO. Preferred amounts of the additive differ according to the type of the additive. Titanium oxide and zinc oxide can be present in an amount of 0.5 to 15 parts by weight, most preferably 0.5 to 5 parts by weight, per 100 parts by weight of the CaO component in the starting material calculated as CaO. On the other hand, an alkali metal chloride or alkaline earth metal chloride can be present in an amount of 0.7 to 46 parts by weight, most preferably 1 to 30 parts by weight, per 100 parts by weight of the CaO component in the starting material calculated as CaO.

According to a preferred embodiment of the invention, the additive substance is mixed with the starting material prior to burning. In order to disperse the additive in the starting material as uniformly as possible, the additive is desirably in the form of a powder that has been pulverized as finely as possible.

The starting material may contain up to 10 parts by weight, desirably up to 5 parts by weight, of other inorganic substances (especially metal oxides) per 100 parts by weight as CaO of the CaO component as impurities in addition to the volatile matter.

In the production of conventional $C_2S$, the inclusion of metal oxides such as iron oxide, aluminum oxide or magnesium oxide in the starting material causes blackening of the resulting $C_2S$, restrains its dusting, and tends to afford $\alpha'$- or $\beta$-type $C_2S$. It has been found however that if the burning is carried out in the presence of titanium oxide, zinc oxide, an alkali metal chloride and/or an alkaline earth metal chloride in accordance with the process of the present invention, the aforesaid phenomena with the conventional techniques do not occur even if the starting material contains these impurities in the amounts described above.

The burning of the starting material may be carried out generally at a temperature of at least 1000° C, preferably 1200° to 1600° C, more preferably 1300° to 1500° C, although the burning temperature is not particularly restricted and may be any temperature at which the CaO component and the $SiO_2$ component in the starting material react to form $C_2S$. Burning in the presence of titanium oxide or zinc oxide may be carried out at a higher temperature, especially at least 1400° C; and burning in the presence of an alkali metal or alkaline earth metal chloride may be carried out at a lower temperature, especially 1300° to 1450° C.

The burning can be performed by any known method, for example, by heating the starting material in a furnace heated at a high temperature, such as an electric furnace, heavy oil furnace or gas furnace. The atmosphere in which to perform the burning is not particularly restricted, and air may be used. If needed, an atmosphere of nitrogen or a pressure-reduced atmosphere may be used.

The burning can be carried out until the starting material is wholly sintered or melted to form a uniform reaction product. Generally, the burning can be carried out for at least 15 minutes at the burning temperatures given above, and preferably 0.5 to 5 hours, and most preferably about 1 to 3 hours depending upon the burning temperature employed.

The burnt product is then cooled. Cooling may be spontaneous cooling or forced cooling. The forced cooling may be done by using a cooled air or other gas or a liquid cooling medium, especially water. The use of a cooled gas is convenient.

The burnt product undergoes spontaneous dusting during the course of cooling and solidification, and a very fine $\gamma$-$C_2S$ powder having a very uniform particle diameter is recovered as a final product.

The $\gamma$-$C_2S$ powder obtained by the process of the invention is characterized by being uniform and fine in particle size. The fineness of the powder is such that as will be seen from Examples given hereinbelow, substantially all particles have a particle diameter of not more than 60 microns, usually not more than 50 microns. The uniformity of the particle diameter of the $\gamma$-$C_2S$ powder in accordance with this invention is demonstraed by the fact that when a particle diameter distribution curve of the $\gamma$-$C_2S$ powder is drawn with the axis of abscissas representing its particle diameter and the axis of ordinates representing the frquency of the ocurrence of particle diameters, the peak of the curve rises sharply, and the bottom of the peak is narrow. Specifically, almost all the particles, namely at least 80% of all particles, have a particle diameter within the range of 5 to 30 microns.

According to the process of the invention, a very fine $\gamma$-$C_2S$ powder having uniform particle diameter can be easily produced without any need to mechanical pulverization or sieving.

When the starting material is burned in the presence of an alkali metal chloride and/or an alkaline earth metal chloride, an additional advantage can be obtained in that the resulting $\gamma$-$C_2S$ has a very high specific surface area, usually a specific surface area of 4 to 15 $m^2/g$. In this case, the alkali metal chloride or alkaline earth metal chloride may be present singly, or together with titanium oxide and/or zinc oxide. When they are conjointly used, the alkali metal chloride or alkaline earth metal chloride and titanium oxide or zinc oxide may be present in the amounts indicated above, but the amounts may be somewhat smaller. It is especially advantageous that per 100 parts by weight of the CaO component in the starting material as CaO, the alkali metal chloride or alkaline earth metal chloride is present in an amount of 0.5 to 5 parts by weight, and titanium oxide or zinc oxide, in an amount of 0.5 to 5 parts by weight.

It has been found that according to another aspect of the invention, a $\gamma$-$C_2S$ powder having a very fine and uniform particle diameter and a very high specific surface area can be produced also by a two-step process which comprises burning the starting material comprising the CaO component and $SiO_2$ component in the presence of titanium oxide and/or zinc oxide by the process already described above to form a very fine $\gamma$-$C_2S$ powder having a uniform particle diameter, and then heating the resulting fine $\gamma$-$C_2S$ powder in the presence of an alkali metal oxide and/or an alkaline earth metal oxide.

The first step of burning the starting material in the presence of titanium oxide and/or zinc oxide to recover a uniform and fine $\gamma$-$C_2S$ powder can be performed in the same manner as described hereinabove.

The resulting fine $\gamma$-$C_2S$ powder is heated in the second step in the presence of a metal oxide selected from alkali metal oxides and alkaline earth metal oxides. In the second step, the metal oxide may be in this form under the heating conditions to be described, and its form as added to the $\gamma$-$C_2S$ powder is not particularly restricted. Desirably, it is in a form which will not substantially leave a solid impurity in the $\gamma$-$C_2S$ after the heat-treatment.

The metal oxide can therefore be added as such to the $\gamma$-$C_2S$ powder. Preferably, however, it is added to the $\gamma$-$C_2S$ powder in the form of a compound which will decompose to a metal oxide and a volatile matter under the heating conditions to be described, thus yielding an alkali metal oxide or an alkaline metal oxide. Preferred alkali metal oxides and alkaline earth metal oxides are the oxides of sodium, potassium, lithium, rubidium, cesium, beryllium, magnesium, calcium, strontium, and barium. Of these, sodium oxide, potassium oxide, magnesium oxide and calcium oxide are especially preferred.

Examples of compounds which will yield such alkali metal oxides or alkaline earth metal oxides are the carbonates or hydrogen carbonates of alkali metals or alkaline earth metals, and the hydroxides of alkaline earth metals; specifically sodium carbonate, potassium carbonate, lithium carbonate, beryllium carbonate, magnesium carbonate, calcium carbonate, strontium carbonate, barium carbonate, sodium hydrogen carbonate, potassium hydrogen carbonate, rubidium hydrogen carbonate, magnesium hydrogen carbonate, calcium hydrogen carbonate, strontium hydrogen carbonate, barium hydrogen carbonate, magnesium hydroxide, calcium hydroxide, and barium hydroxide. The alkali metal or alkaline earth metal carbonates or hydrogen carbonates are especially effective. Of these, magnesium carbonate, sodium hydrogen carbonate and potassium hydrogen carbonate are preferred. These compounds can be used either alone or if desired as admixture of two or more.

These compounds can be used in amounts which will, under the heating conditions, lead to the formation of at least 0.1 part by weight, preferably 0.2 to 20 parts by weight, more preferably 0.5 to 15 parts by weight, per 100 parts by weight of the $\gamma$-$C_2S$ powder, of an alkali metal oxide or an alkaline earth metal oxide. When the metal oxide itself is used, it is added in these amounts to the $\gamma$-$C_2S$ powder.

The $\gamma$-$C_2S$ powder can be heated in the presence of the metal oxide at a temperature of at least 500° C. Suitable heating temperatures varying depending upon the type of the metal compound, the particle size of the $\gamma$-$C_2S$ powder, etc. Usually, it is 900° to 1300° C, and preferably 1000° to 1200° C.

The atmosphere in which to perform the heat-treatment is not particularly restricted, and air may be used. If desired, the heating may be carried out in an atmosphere of nitrogen or in a pressure-reduced atmosphere.

The heating time also varies widely depending upon the type of the metal oxide used, the particle size of the $\gamma$-$C_2S$ powder, the heating temperature, etc. Generally, it is at last 15 minutes, preferably 0.5 to 5 hours, more preferably 1 to 3 hours.

The heating may be carried out by a usual method, for example by using an electric furnace, heavy oil furnace, or gas furnace heated at high temperatures.

Cooling of the heat-treated product affords a $\gamma$-$C_2S$ powder having the same particle diameter as that of the $\gamma$-$C_2S$ before heating but having a far higher specific surface area. The cooling may be performed spontaneously or forcibly (e.g., air cooling, water cooling, etc.).

This aspect of the present invention affords a γ-C₂S powder generally having a specific surface area of 3 to 10 m²/g.

The process of this invention described hereinabove can afford a γ-C₂S powder having a very fine and uniform particle diameter without using any mechanical pulverizing or sieving means. In one aspect of the invention, the resulting γ-C₂S powder has a very high specific surface area in addition to the fine and uniform particle diameter. The γ-C₂S powders provided by the present invention have a great powder for capturing hydrogen halide and are useful as stabilizers for halogen-containing resins such as polyvinyl chloride. Moreover, they have low water absorption and superior affinity for various synthetic resins, and are useful as fillers for various synthetic resins.

The following examples further illustrate the present invention.

All parts in the examples are parts by weight unless otherwise specified.

The "particle size distribution" was measured by a light transmission-type particle size distribution measuring device (a product of Seisin Kigyosha Co., Ltd.).

"The specific surface area" is measured by the BET method using a Sorptometer (a product of Perkin Elmer Co., Ltd.).

The "stability to chlorine-containing resins" was determined in the following manner. Five parts of a sample γC₂S powder was added to 100 parts of a vinyl chloride resin having a degree of polymerization of 1050, and they were well mixed. In accordance with JIS K-6723 (heat stability test), the resultant mixture was immersed in an oil bath at 200° C, and the time which elapsed until a Congo red test paper placed in it turned blue was measured.

EXAMPLE 1

Silicic anhydride (53.6 part), 178.4 parts (100 pats calculated as CaO) of calcium carbonate, and 0.71 part of titanium oxide were mixed, and thoroughly stirred. The mixture obtained was placed in a porcelain crucible, and heated to 1450° C by a siliconit electric furnace at a heating rate of 5° C/sec., and burned at 1450° C for 2 hours, The burnt product was withdrawn from the furnace while it was at high temperatures, and then allowed to cool.

Spontaneous powdering of the burnt product took place in the course of cooling to form a white powder. X-ray diffraction analysis showed that it consisted of pure γ-C₂S free from unreacted calcium oxide. The particle size distribution of the powder measured, is as follows:

| 0 to 5 | microns | 8.4% | by weight |
|---|---|---|---|
| 5 to 10 | " | 24.7 | " |
| 10 to 20 | " | 42.5 | " |
| 20 to 30 | " | 13.7 | " |
| 30 to 40 | " | 5.6 | " |
| 40 to 50 | " | 5.1 | " |
| more than 50 | " | 0 | " |

The results of measurement showed that the resulting γ-C₂S has an average particle diameter of 15 microns, and most of the particles had a particle diameter within the range of 5 to 30 microns. It was confirmed therefore that the resulting powder was uniform and fine in size.

EXAMPLE 2

Silicic anhydride (53.0 parts), 178.4 parts of calcium carbonate and 0.71 part of titanium oxide were mixed, and thoroughly stirred. The mixture was burned in the same manner as in Example 1. Spontaneous powdering of the burnt product took place during the course of spontaneous cooling to give a white powder. The white powder obtained was pure γ-C₂S free from unreacted calcium oxide. It was fine and uniform in size and had an average particle diameter of about 15 microns.

The particle size distribution of the resulting powder was as follows:

| 0 to 5 | microns | 9.0% | by weight |
|---|---|---|---|
| 5 to 10 | " | 25.1 | " |
| 10 to 20 | " | 42.6 | " |
| 20 to 30 | " | 14.2 | " |
| 30 to 40 | " | 5.7 | " |
| 40 to 50 | " | 3.4 | " |
| more than 50 | " | 0 | " |

EXAMPLE 3

A siliceous stone powder ( a product of Shiraishi Kogyo Co., Ltd.; 42.9 parts), 178.4 parts of hard calcium carbonate, and 14.8 parts of titanium oxide (a product of Ishihara Sangyo Kabushiki Kaisha) were mixed. The mixture was burned in the same manner as in Example 1. Spontaneous powdering of the burnt product took place during the course of spontaneous cooling to give a white powder.

The resulting white powder consisted mainly of γ-C₂S with a small amount of calcium titanate, but was free from unreacted calcium oxide. It was fine and uniform in size, and had an average particle diameter of about 15 microns. Its particle size distribution was as follows:

| 0 to 5 | microns | 7.2% | by weight |
|---|---|---|---|
| 5 to 10 | " | 23.5 | " |
| 10 to 20 | " | 40.1 | " |
| 20 to 30 | " | 13.5 | " |
| 30 to 40 | " | 5.5 | " |
| 40 to 50 | " | 5.0 | " |
| 50 to 74 | " | 3.2 | " |
| 74 to 147 | " | 2.0 | " |
| more than 147 | " | 0 | " |

Comparative Example 1

Silicic anhydride (a product of Nakarai Chemical Co., Ltd.; 53.6 parts) was mixed with 178.4 parts of heavy calcium carbonate, and the mixture was burned at 1550° C for 2 hours by a method similar to that given in Example 1. Spontaneous powdering of the burnt product took place during the course of spontaneous cooling, but the resulting white powder of γ-C₂S had a coarse particle size. Its particle size distribution was as follows:

| 0 to 50 | microns | 3.9% | by weight |
|---|---|---|---|
| 50 to 74 | " | 8.4 | " |
| 74 to 147 | " | 29.2 | " |
| more than 147 | " | 58.5 | " |

Comparative Example 2

Silicic anhydride (53.6 parts), 178.4 parts of calcium carbonate and 3.6 parts by weight of ferric oxide were mixed and well stirred. The mixture was burned in the same manner as in Example 1, and the burnt product was allowed to cool spontaneously. Spontaneous powdering of the burnt product took place during the spontaneous cooling.

The powder obtained did not contain unreacted calcium oxide and consisted almost entirely of $\gamma$-C$_2$S. It, however, turned slightly brown. The particle size distribution of the powder was as follows:

| | | | |
|---|---|---|---|
| 0.5 to 5 | microns | 3.1% | by weight |
| 5 to 10 | " | 10.2 | " |
| 10 to 20 | " | 26.4 | " |
| 20 to 30 | " | 17.8 | " |
| 30 to 40 | " | 9.6 | " |
| 40 to 50 | " | 10.0 | " |
| 50 to 74 | " | 17.5 | " |
| 74 to 147 | " | 3.1 | " |
| more than 147 | " | 2.3 | " |

Its particle diameter was not uniform, and it contained considerable amounts of particles having a diameter of more than 50 microns.

EXAMPLE 4

The following experiment was performed in order to demonstrate that the $\gamma$-C$_2$S powder obtained in Example 1 had low water absorption, and was a good filler for synthetic resins.

(A) Measurement of water absorption (volume change)

The volume of a sample powder was measured. The powder was then dipped in water for a given period of time. The powder was collected by filtration, washed well with methanol, and dried for 24 hours at room temperature under reduced pressure. Then, its volume was again measured, and an increase in volume over the initial volume as examined. The change in volume was larger with higher water absorption. The results are shown in the following table.

| | Change (%) in volume after dipping in water for the periods indicated | | |
|---|---|---|---|
| Sample | 3 days | 7 days | 14 days |
| $\gamma$-C$_2$S powder of Example 1 | 0.45 | 3.0 | 3.0 |
| $\gamma$-C$_2$S powder of Comparative Example 1 | 0.5 | 5.0 | 5.5 |
| Commercially available $\beta$-C$_2$S powder (*a) | 3.7 | 8.6 | 9.8 |
| Commercially available $\alpha'$-C$_2$S powder (*b) | 10.8 | 15.6 | 25.1 |

Note
(*a): The powder obtained by calcining a mixture of 53.6 parts of a silica powder, 178.4 parts of heavy calcium carbonate and 2 parts of boron oxide at 1450° C for 2 hours, and pulverizing the calcination product to an average particle diameter of 15 microns by a ball mill.
(*b): The powder prepared from 48.2 parts of a silica powder, 178.4 parts of heavy calcium carbonate and 12.2 parts of barium oxide in the same way as in (*a) above. These results show that the $\gamma$-Chd 2S powder obtained by theprocess of this invention has low water absorption.

(B) Measurement of the stretchability of films

The $\gamma$-C$_2$S powder obtained in Example 1, and the $\gamma$-C$_2$S powder obtained in Comparative Example 1 were used in this measurement.

50 Parts of each of the powders was added to 100 parts by weight of polyethylene. The mixture was well kneaded by a roll to form a polyethylene sheet having a thickness of 1 mm. Attempt was made to stretch the sheet biaxially to 10 times in area by the tenter process while it was heated in hot air at 120° C. The sheet obtained from the mixture containing the $\gamma$-C$_2$S powder of Comparative Example 1 was broken at those parts in which large particles were present, and teared off when the stretch ratio in area reached 2:1. In contrast, the sheet prepared from the mixture containing the $\gamma$-C$_2$S powder obtained in Example 1 could be stretched to 10 times, and the stretched film was uniform and smooth.

It is thus confirmed from the two experiments that the $\gamma$-C$_2$S powder obtained by the process of this invention is superior as a filler for synthetic resins.

EXAMPLE 5

A siliceous stone powder (53.6 parts), 178.4 parts of heavy calcium carbonate and 3 parts of zinc oxide were mixed, and the mixture burned in the same way as in Example 1. Spontaneous powdering of the burnt product took place in the course of cooling to give a white powder of $\gamma$-C$_2$S which had the following particle size distribution.

| | | | |
|---|---|---|---|
| 0 to 5 | microns | 2.8% | by weight |
| 5 to 10 | " | 14.2 | " |
| 10 to 20 | " | 67.8 | " |
| 20 to 30 | " | 0.8 | " |
| 30 to 40 | " | 8.8 | " |
| 40 to 50 | " | 5.6 | " |
| more than 50 | " | 0 | " |

EXAMPLES 6 to 8

A given amount (7.7 parts for Example 6, 15 parts for Example 7, and 30 parts for Example 8) of calcium chloride was added to a composition consisting of 53.6 parts of a siliceous stone powder and 178.4 parts (100 parts calculated as CaO) of calcium carbonate, and the mixture was stirred.

The mixture was fed into an electric furnace, and burned at about 1300° C for 2 hours. Immediately after the burning, the burnt product was taken out of the furnace to allow it to cool in the air. During the course of cooling, the burnt product was naturally powdered to a white powder. X-ray diffraction analysis showed that the resulting powder in each run was pure $\gamma$-C$_2$S. Its electron microscopic examination showed that its surface was uneven with raised and depressed portions, and it had an average particle diameter of about 15 microns with most of the particles having a diameter within the range of 5 to 30 microns. The particle size distribution of each of the powders was as follows:

| Particle diameter (microns) | Example 6 (wt. %) | Example 7 (wt. %) | Example 8 (wt. %) |
|---|---|---|---|
| 0 to 5 | 10.1 | 10.1 | 5.5 |
| 5 to 10 | 18.1 | 18.1 | 17.1 |
| 10 to 20 | 40.0 | 40.0 | 35.6 |
| 20 to 30 | 20.0 | 20.5 | 18.5 |
| 30 to 40 | 4.6 | 4.6 | 10.5 |
| 40 to 50 | 7.2 | 7.2 | 6.3 |
| 50 to 74 | 0 | 0 | 3.5 |
| 74 to 147 | 0 | 0 | 3.0 |
| more than 147 | 0 | 0 | 0 |

The specific surface area and stability to chlorine-containing resins of the resulting $\gamma$-C$_2$S powders were determined, and the results are shown in Table 1. A comparison of the results with those obtained in Example 11 shows that the $\gamma$-C$_2$S powders obtained in this Example had a high specific curface area and improved stability.

EXAMPLES 9 and 10

A given amount (5 parts for Example 9, and 10 parts for Example 10) of magnesium chloride was added to a composition consisting of 34.9 parts of a siliceous stone powder and 116.1 parts (65.1 parts calculated as CaO) of calcium carbonate, and the mixture was stirred. The mixture was fed into an electric furnace, and burned at about 1350° C for 2 hours. After the burning, the burnt product was withdrawn from the furnace while it was at high temperatures. It was cooled in the air. Spontaneous powdering of the burnt product took place in the course of cooling to give a white powder.

The resulting powder was pure $\gamma$-$C_2S$ which had an uneven surface with raised and depressed portions. The powder had an average particle diameter of about 15 microns. As demonstrated by the following particle size distribution, most of the particles had a diameter within the range of 5 to 30 microns.

| Particle diameter (microns) | Example 9 (wt. %) | Example 10 (wt. %) |
|---|---|---|
| 0 to 5 | 8.1 | 7.5 |
| 5 to 10 | 18.0 | 19.2 |
| 10 to 20 | 36.7 | 40.3 |
| 20 to 30 | 19.2 | 20.5 |
| 30 to 40 | 4.5 | 4.4 |
| 40 to 50 | 9.2 | 5.5 |
| 50 to 74 | 4.3 | 2.6 |
| more than 74 | 0 | 0 |

The specific surface area and stability of the $\gamma$-$C_2S$ powers obtained were also determined, and the results are shown in Table 1.

EXAMPLE 11

A siliceous stone powder (34.9 parts), 116.1 parts (65.1 parts calculated as CaO), and 0.46 part of titanium oxide were well stirred to form a mixture. The resulting mixture was burned at 1400° C in the same way as in Example 6. The burnt product was cooled in the air. Spontaneous powdering of the burnt product took place in the course of cooling.

The powder was $\gamma$-$C_2S$ and had an average particle diameter of about 15 microns with most of the particles having a particle diameter within the range of 5 to 30 microns. The surface of the particles were smooth.

The specific surface area and stability of the $\gamma$-$C_2S$ powder were determined, and the results are shown in Table 1.

Table 1

| Example | Specific surface area (m$^2$/g) | Stability (seconds) |
|---|---|---|
| 6 | 7.5 | 640 |
| 7 | 12.0 | 940 |
| 8 | 8.0 | 710 |
| 9 | 7.5 | 540 |
| 10 | 8.0 | 660 |
| 11 | 2.6 | 180 |
| Blank* | — | 65 |

*Vinyl chloride resin alone

EXAMPLE 12

Sodium chloride (10 parts) was added to a composition consisting of 53.6 parts of a siliceous stone powder and 178.4 parts (100 parts calculated as CaO), and they were stirred to form a mixture. The mixture was burned at about 1300° C for 1 hour in a manner similar to that in Example 1. Spontaneous powdering of the burnt product took place in the course of cooling to give a white powder of $\gamma$-$C_2S$ which had the following particle size distribution.

| 0 to 5 | microns | 8.5% | by weight |
|---|---|---|---|
| 5 to 10 | " | 17.0 | " |
| 10 to 20 | " | 38.4 | " |
| 20 to 30 | " | 21.5 | " |
| 30 to 40 | " | 7.0 | " |
| 40 to 50 | " | 7.6 | " |
| more than 50 | " | 0 | " |

EXAMPLE 13

To 100 parts of the $\gamma$-$C_2S$ powder obtained in Example 11 was added 15 parts of sodium carbonate, and they were well stirred to form a mixture. The resulting mixture was fed into an electric furnace, and again burned at about 1000° C for 2 hours. The burnt product was cooled to afford a white powder. The powder was pure $\gamma$-$C_2S$ having an average particle diameter of about 15 microns. As is shown by the following particle size distribution, most of the particles had a diameter of 5 to 30 microns. The surfaces of the particles had raised and depressed portions.

| 0 to 5 | microns | 8.4% | by weight |
|---|---|---|---|
| 5 to 10 | " | 24.7 | " |
| 10 to 20 | " | 42.5 | " |
| 20 to 30 | " | 13.7 | " |
| 30 to 40 | " | 5.6 | " |
| 40 to 50 | " | 5.1 | " |
| more than 50 | " | 0 | " |

The specific surface area and stability of the resulting $\gamma$-$C_2S$ powder were measured, and the results are shown in Table 2.

Table 2 shows that the $\gamma$-$C_2S$ powder obtained in Example 13 had a higher specific surface area and better stability than the $\gamma$-$C_2S$ powder obtained in Example 11.

EXAMPLE 14

Potassium carbonate (20 parts) was added to 100 parts of the $\gamma$-$C_2S$ powder obtained in Example 11, and they were well stirred to form a mixture. The resulting mixture was fed into an electric furnace, and again burned at about 1000° C for 2 hours. The burnt product was cooled to afford a white powder. The powder was pure $\gamma$-$C_2S$ having an average particle diameter of about 15 microns. Its particle size distribution shown below indicates that most of the particles had a diameter of 5 to 30 microns. The surfaces of the particles had raised and depressed portions.

| 0 to 5 | microns | 8.4% | by weight |
|---|---|---|---|
| 5 to 10 | " | 24.7 | " |
| 10 to 20 | " | 42.5 | " |
| 20 to 30 | " | 13.7 | " |
| 30 to 40 | " | 5.6 | " |
| 40 to 50 | " | 5.1 | " |
| more than 50 | " | 0 | " |

The specific surface area and stability of the resulting $\gamma$-$C_2S$ powder were measured, and the results are shown in Table 2.

Table 2 shows that the $\gamma$-$C_2S$ powder obtained in Example 14 had a higher specific surface area and better stability than the $\gamma$-$C_2S$ powder obtained in Example 11.

EXAMPLE 15

Magnesium carbonate (10 parts) was added to 100 parts of the γ-$C_2S$ powder obtained in Example 11, and they were well stirred to form a mixture. The mixture was heat-treated in the same way as in Example 13 to afford a white powder. The powder was pure γ-$C_2S$ having an average particle diameter of about 15 microns. Its particle size distribution shown below indicates that most of the particles had a diameter of 5 to 30 microns. The surfaces of the particles had raised and depressed portions.

| | | | |
|---|---|---|---|
| 0 to 5 | microns | 8.4% | by weight |
| 5 to 10 | " | 24.7 | " |
| 10 to 20 | " | 42.5 | " |
| 20 to 30 | " | 13.7 | " |
| 30 to 40 | " | 5.6 | " |
| 40 to 50 | " | 5.1 | " |
| more than 50 | " | 0 | " |

The specific surface area and stability of the resulting γ-$C_2S$ powder were measured, and the results are shown in Table 2.

It can be seen from Table 2 that the γ-$C_2S$ obtained in Example 15 had a higher specific surface area and better stability than the γ-$C_2S$ obtained in Example 11.

Table 2

| Examples | Specific surface area ($m^2/g$) | Stability (seconds) |
|---|---|---|
| 11 | 2.6 | 180 |
| 13 | 5.0 | 340 |
| 14 | 4.0 | 420 |
| 15 | 3.5 | 270 |

What we claim is:

1. A process for producing a fine powdery γ-dicalcium silicate which comprises mixing a calcium oxide componenet, a silicon dioxide component, and at least one compound selected from the group consisting of titanium oxide, zinc oxide, alkali metal chlorides and alkaline earth metal chlorides; burning the mixture; and recovering the resulting fine powdery γ-dicalcium silicate.

2. The process of claim 1 wherein the alkali metal chloride is sodium chloride.

3. The process of claim 1 wherein the alkaline earth metal chloirde is calcium chloride or magnesium chloride.

4. The process of claim 1 wherein the amount of said compound is at least 0.3 part by weight per 100 parts by weight of the calcium oxide component calculated as CaO.

5. The process of claim 1 wherein the amount of said compound is 0.5 to 50 parts by weight per 100 parts by weight of the calcium oxide component as CaO.

6. The process of claim 1 wherein the burning is carried out in the presence of 0.5 to 15 parts by weight, per 100 parts by weight of the calcium oxide component calculated as CaO, of titanium oxide or zinc oxide.

7. The process of claim 1 wherein the burning is carried out in the presence of 0.7 to 46 parts by weight, per 100 parts by weight, of an alkali metal chloride or an alkaline earth metal chloride.

8. The process of claim 1 wherein the burning is carried out at a temperature of at lest 1,000° C.

9. The process of claim 1 wherein the burning is carried out at a temperature of 1,200° to 1,600° C.

10. The process of claim 1 wherein the burning is carried out for at least 15 minutes.

11. The process of claim 1 wherein the γ-dicalcium silicate recovered has a particle diameter of substantially not more than 50 microns.

12. The process of claim 1 wherein the burning is carried out in the presence of an alkali metal chloride or an alkaline earth metal chloride, and γ-dicalcium silicate having a fine particle diameter and a high specific surface area is recovered.

13. The process of claim 1 wherein the starting material consists of a mixture of a calcium oxide-containing substance and a silicon dioxide-containing substance.

14. The process of claim 13 wherein the calcium oxide-containing substance is calcium oxide or a CaO-containing substance which will decompose to CaO and a volatile matter under the burning conditions.

15. The process of claim 14 wherein the CaO-containing substance is calcium carbonate, calcium bicarbonate, or calcium hydroxide.

16. The process of claim 15 wherein the silicon dioxide-containing substance is amorphous silica, silicic anhydride, siliceous stone, silica sand, quartz, or silicic acid.

17. The process of claim 1 wherein the starting material contains 100 parts by weight of the calcium oxide component calculated as CaO, and 60 to 40 parts by weight of the silicon dioxide component calculated as $SiO_2$.

18. A process for producing γ-dicalcium silicate having a fine particle diameter and a high specific surface area which comprises mixing a calcium oxide component, a silicon dioxide component, and a compound selected from titanium oxide and zinc oxide; burning the mixture; heating the resulting fine powdery γ-dicalcium silicate in the presence of a metal oxide selected from the group consisting of alkali metal oxides and alkaline earth metal oxides; and recovering γ-dicalcium silicate having a fine particle diameter and a higher specific surface area.

19. The process of claim 18 wherein a compound which will yield an alkali metal or alkaline earth metal oxide under the heating conditions is added to the fine powdery γ-dicalcium silicate, and the the mixture is heated.

20. The process of claim 19 wherein the compound is selected from the group consisting of the carbonates and bicarbonates of alkali metals and the carbonates and the hydroxides of alkaline earth metals.

21. The process of claim 18 wherein the amount of the alkali metal or alkaline earth metal oxide is at least 0.1 part by weight per 100 parts by weight of the fine powdery γ-dicalcium silicate.

22. The process of claim 18 wherein the amount of the alkali metal or alkaline earth metal oxide is 0.2 to 20 parts by weight per 100 parts by weight of the fine powdery γ-dicalcium silicate.

23. The process of claim 18 wherein the heating is carried out at a temperature of at least 500° C.

24. The process of claim 18 wherein the heating is carried out at a temperature of 900° to 1,300° C.

25. The process of claim 18 wherein the heating is carried out for at least 15 minutes.

* * * * *